United States Patent [19]
Sato

[11] Patent Number: 5,943,142
[45] Date of Patent: Aug. 24, 1999

[54] APPARATUS FOR READING AND RECORDING IMAGES

[75] Inventor: Tatsuya Sato, Ichinomiya, Japan

[73] Assignee: Brother Kogyo Kabushiki Kaisha, Nagoya, Japan

[21] Appl. No.: 08/844,639

[22] Filed: Apr. 21, 1997

[30] Foreign Application Priority Data

May 10, 1996 [JP] Japan .................................. 8-116125

[51] Int. Cl.$^6$ .................................................... H04N 1/40
[52] U.S. Cl. .......................... 358/471; 347/235; 347/250; 358/296
[58] Field of Search .................................. 358/471, 472, 358/300, 302, 296, 475; 382/321; 347/250, 235

[56] References Cited

U.S. PATENT DOCUMENTS

| | | | |
|---|---|---|---|
| 4,264,120 | 4/1981 | Uchiyama | 359/218 |
| 4,894,669 | 1/1990 | Sugiura et al. | 347/250 |
| 4,947,261 | 8/1990 | Ishikawa et al. | 358/471 |
| 5,105,279 | 4/1992 | Kamada et al. | 358/472 |
| 5,408,341 | 4/1995 | Takanashi et al. | 358/471 |
| 5,426,528 | 6/1995 | Yamamoto et al. | 347/250 |
| 5,537,214 | 7/1996 | Aiba et al. | 358/472 |
| 5,616,914 | 4/1997 | Matsuda | 358/471 |
| 5,648,800 | 7/1997 | Takeda | 358/296 |
| 5,671,069 | 9/1997 | Kodam | 358/471 |
| 5,737,004 | 4/1998 | Rodi | 358/300 |

*Primary Examiner*—Amelia Au
*Assistant Examiner*—Gilbert Frederick, II
*Attorney, Agent, or Firm*—Oliff & Berridge, PLC

[57] ABSTRACT

An image reading and recording apparatus includes a reading section for optically reading an image for output of image signals, and a recording section for generating and controlling a light beam to record the read image on the basis of the image signals. The apparatus further includes a light sensor for detecting the light beam at a predetermined position and for generating a record timing signal which determines start timing for control of the optical beam, a counter for determining lapse of a predetermined time since the generation of the record timing signal, and a read timing signal generator for generating, upon the lapse of the predetermined time, a read timing signal which determines timing for output of the image signals from the reading section.

15 Claims, 4 Drawing Sheets

APPARATUS FOR READING AND RECORDING IMAGES

BACKGROUND OF THE INVENTION

1. Field of the Invention

The present invention relates to an image reading and recording apparatus for optically reading an image from an image carrying medium and for optically recording the read image onto a recording medium.

2. Description of the Related Art

A facsimile machine is known which has a copying function by incorporation of a laser beam printer. Such a facsimile machine comprises a reading section for optically reading an image from an image carrying medium for output of image signals, a recording section for generating and controlling a light beam to record the read image onto a recording medium on the basis of the image signals, a record timing signal generator for detecting the light beam at a predetermined position and for generating a record timing signal which determines start timing for control of the optical beam.

In the conventional facsimile machine described above, the image data read by the reading section are temporarily stored in a memory for each page, and the stored image data are then read out by the recording section successively on a line-by-line basis. Such temporary storage of the optically read image is necessary because the polygon mirror used for scanning the laser beam in a primary scanning direction is unstable or inaccurate with respect to its rotational cycle and therefore makes it difficult to synchronize the read timing with the record timing.

Thus, with the conventional facsimile machine, the need for temporary storage of the optically read image makes it necessary to provide a separate memory for such a purpose, thereby increasing the cost of the facsimile machine. Particularly, when the image data in multiple gradations need be stored, the capacity of the memory must be correspondingly increased to make the problem of cost increase even more remarkable. Further, the provision of such a memory necessitates access to that memory both the time of storing and reading out the image data, consequently prolonging the time required for copying.

SUMMARY OF THE INVENTION

It is, therefore, an object of the present invention is to provide an image reading and recording apparatus which, while utilizing a light beam for image recording, does not require a memory for storing image signals in copying an optically read image.

According to one aspect of the present invention, there is provided an apparatus for reading and recording images comprising: reading means for optically reading an image for output of image signals; recording means for generating and controlling a light beam to record the read image on the basis of the image signals; record timing signal generating means for detecting the light beam at a predetermined position and for generating a record timing signal which determines start timing for control of the light beam; timer means for measuring lapse of a predetermined time since the generation of the record timing signal; read timing signal generating means for generating, upon the lapse of the predetermined time, a read timing signal which determines timing for output of the image signals from the reading means.

With such a design, since the read timing signal is generated upon lapse of the predetermined time since the generation of the record timing signal, the image record timing can be synchronized with the image read timing by appropriately setting the predetermined time at which the read timing signal is generated. Thus, no memory is required for storing the image signals before recording or copying the optically read image onto a recording paper sheet with the use of the light beam, thereby reducing the cost of the image reading/recording apparatus. Further, since it is unnecessary to make access to the memory for storing and reading out the image signals, the image copying operation may be performed quickly.

Specifically, the time interval from the generation of the record timing signal to the actual start of recording for each primary scanning line is determined uniquely by the design of the recording means, whereas the time interval from the generation of the read timing signal to the actual output of image signals is determined uniquely by the design of the reading means. Thus, by suitably setting the predetermined time at which the read timing signal is generated, it is possible to synchronize the start timing of recording with the output start timing of image signals for each primary scanning line. Here, the start timing of recording represents the timing at which the light beam reaches the starting end of each primary scanning line (recording area), whereas the output start timing of image signals represents the timing at which the reading means starts output of effective image signals at the starting edge of the reading area.

The image reading/recording apparatus to which the present invention is applicable may be a facsimile machine which has a copying function by incorporation of a laser beam printer for example. However, the present invention is also applicable to an electrophotocopier wherein an image is optically read for output of image signals according to which a scanning light beam is controlled for recording.

The reading means may comprise a CCD image sensor or any other type of image sensor, whereas a recording means may comprise an electrophotographic unit in which an electrostatic latent image on the surface of a photosensitive medium is developed by deposition of toner. Alternatively, the recording means may be designed to direct a scanning light beam onto a film which is chemically developed.

The control of the light beam for recording may be such that the light beam is switched on and off for each picture element. Alternatively, the intensity of the light beam may be varied stepwise or steplessly.

Preferably, the timer means is capable of adjustably setting the predetermined time. With such a design, the image reading/recording apparatus can be easily adjusted for appropriate copying by suitably setting the predetermined time even if a change is made with respect to the specifications of the reading and/or recording means, the size and/or set position of the image carrying paper sheet, and so on. However, the setting of the timer means may be fixed if desired.

Typically, the timer means may comprise a counter, particularly a down counter, to which a selected one of different preset values is fed to set the predetermined time. In this case, the counter may be connected to a central processing unit of the reading/recording apparatus to which clock signals are supplied. The different preset values may be stored, for example, in an EEPROM to which the same clock signals are supplied to read out a selected value for setting at the counter.

The record timing signal generating means may be a phototransistor arranged immediately before a recording start position. Alternatively, the phototransistor may be replaced with a photodiode or any other light detecting element.

The read timing signal generating means may be a read timing signal generator incorporated in a central processing unit of the reading/recording apparatus.

According to a preferred embodiment, the light beam is a laser beam. In such an embodiment, the recording means may comprise an electrophotographic unit which includes a photosensitive medium for forming an electrostatic latent image by irradiation of the laser beam under on-off control according to the image signals and for transferring the latent image onto a recording paper. Alternatively, the light beam may be generated by a light emitting diode or any other beam generating source.

According to another aspect of the present invention, there is provided an apparatus for reading and recording images comprising: a reading section for optically reading an image from an image carrying medium for output of image signals; a recording section responsive to the reading section for generating and controlling a light beam to record the read image on the basis of the image signals; a light sensor for detecting the light beam at a predetermined position and for generating a record timing signal which determines start timing for control of the light beam; a counter responsive to the light sensor for determining lapse of a predetermined time since the generation of the record timing signal; a read timing signal generator responsive to the counter for generating, upon the lapse of the predetermined time, a read timing signal which determines timing for output of the image signals from the reading section.

Other objects, features and advantages of the present invention will be apparent from the detailed description of a preferred embodiment given below with reference to the accompanying drawings.

DETAILED DESCRIPTION OF THE PREFERRED EMBODIMENTS

The preferred embodiment of the present invention will be described below with reference to the accompanying drawings.

Figure 1:
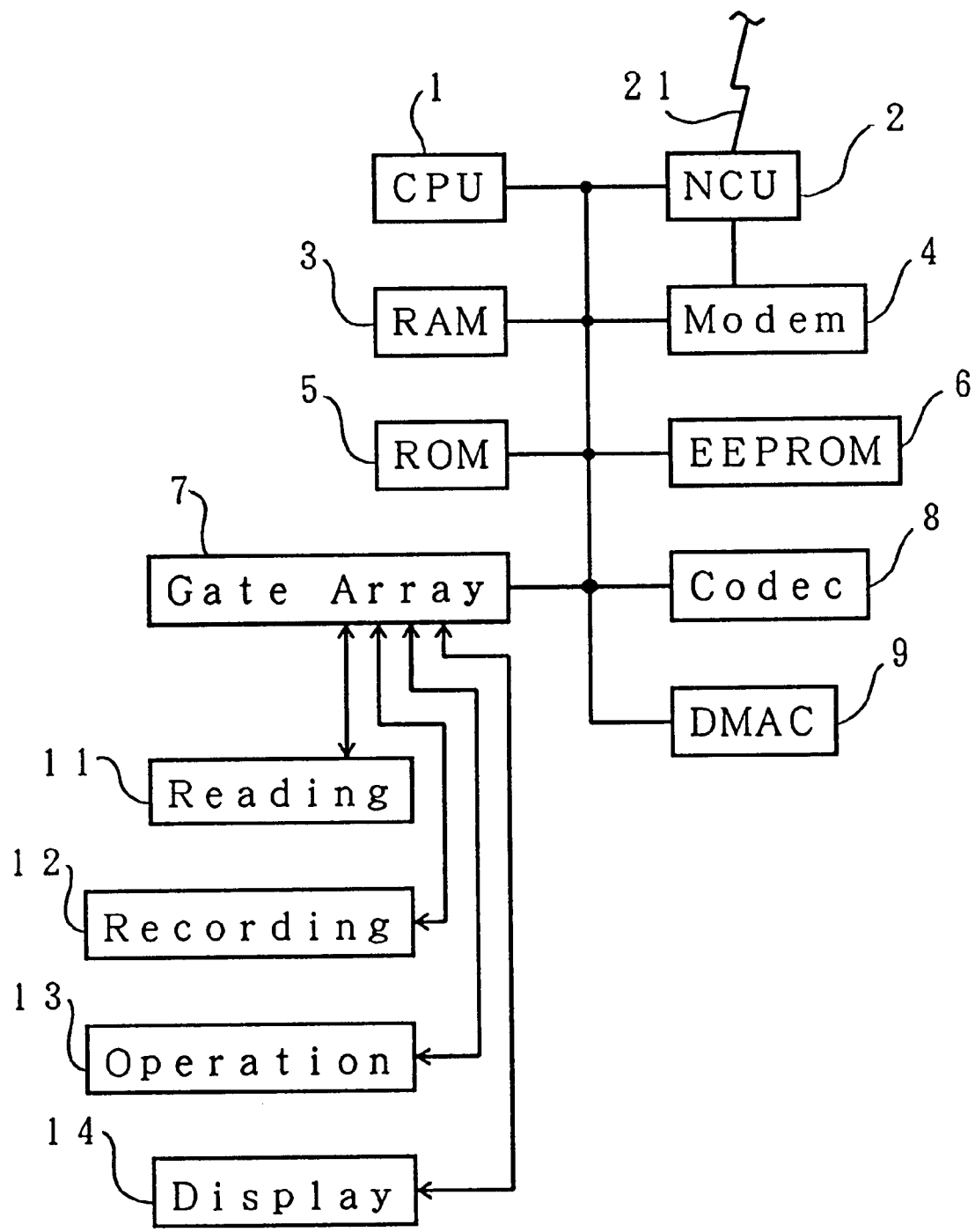
FIG. 1 is a circuit block diagram showing a facsimile machine as an embodiment of image reading/recording apparatus according to the present invention.

Reference is first made to FIG. 1 which is a circuit block diagram showing a principal portion of a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading section 11, a recording section 12, an operation section 13, and a display section 14.

The CPU 1, the NCU 2, the RAM 3, the modem 4, the ROM 5, the EEPROM 6, the gate array 7, the codec 8 and the DMAC 9 are connected to each other via bus lines (digital lines). The bus lines include data bus lines, address bus lines and control signal bus lines. The gate array 7 is connected to the reading section 11, the recording section 12, the operation section 13 and the display section 14, respectively.

The CPU 1 provides an overall control of the facsimile machine.

The NCU 2 is connected to a telephone line 21 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as an I/O interface (input/output interface) for the CPU 1 for data transmission to and/or from the reading section 11, the recording section 12, the operation section 13 and the display section 14.

The codec 8 performs coding of the transmitting image data and decoding of the received image data.

The DMAC 9 provides memory access control with respect to the RAM 3 for example.

The reading section 11 reads out the image data from an image carrying paper sheet (not shown) for output through the gate array 7. Though not shown in the drawings, the reading section 11 includes an array of LEDs (light emitting diodes) as a light source, an array of CCDs (charge coupled devices) as an image sensor, and a motor for feeding an image carrying paper sheet.

The recording section 12 performs printing of images on a recording paper sheet (not shown) on the basis of the image data received through the gate array 7. The details of this recording section will be specifically described hereinafter.

The operation section 13 has key switches to be operated by the user for output of operation signals, whereas the display section 14 includes an LCD (liquid crystal display) or the like for providing various indications under the control of the CPU 1.

Figure 2:
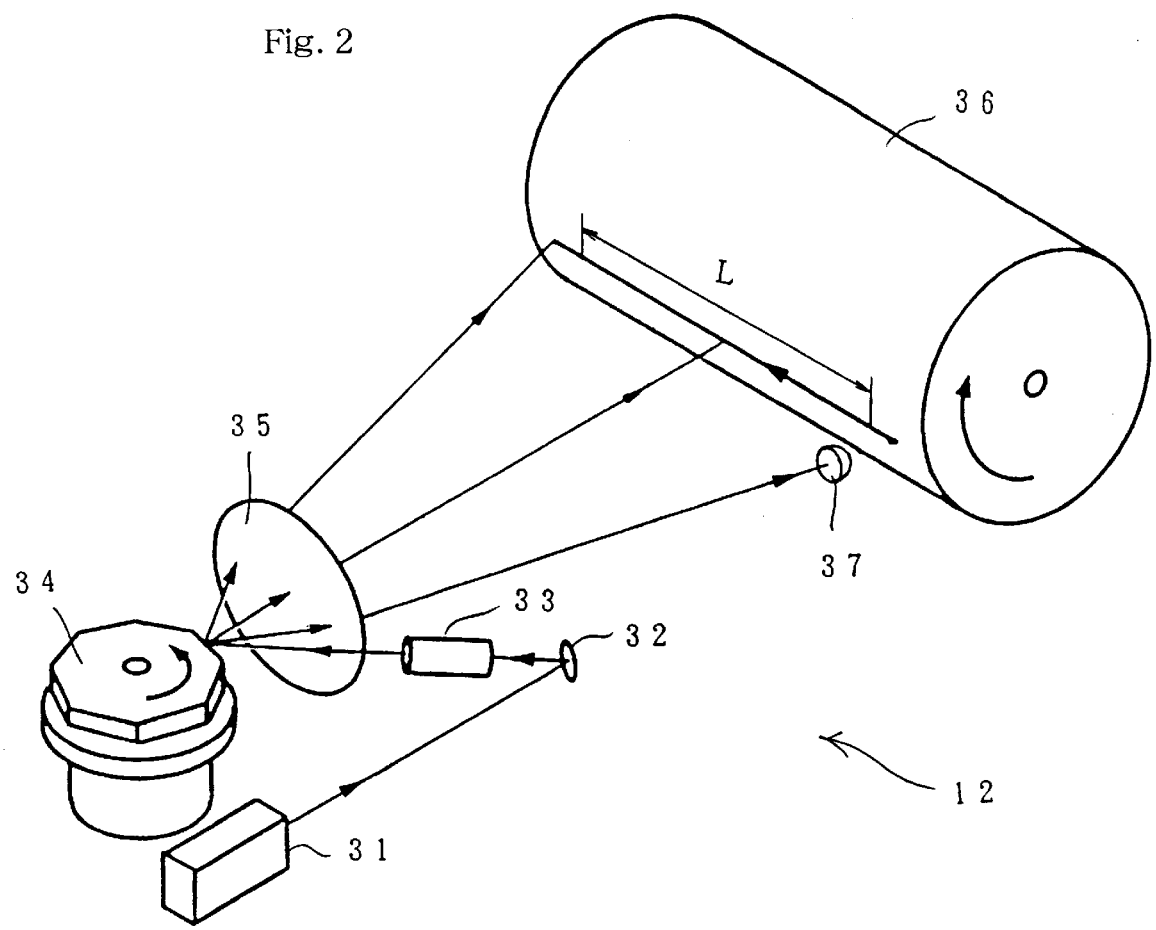
FIG. 2 is a schematic perspective view showing the recording section of the facsimile machine illustrated in FIG. 1.

As shown in FIG. 2, the recording section 12 which is a laser beam printer includes a semiconductor laser device 31, a reflecting mirror 32, a collimating lens 33, a polygon mirror 34, an fθ lens 35, a photosensitive drum 36, and a phototransistor 37. Though not shown, the recording unit 12 also includes an electrostatically charging device, a developing device, an image fixing device, and a charge removing device, all of which are arranged adjacent to the photosensitive drum 36 in a well known manner.

Figure 5:
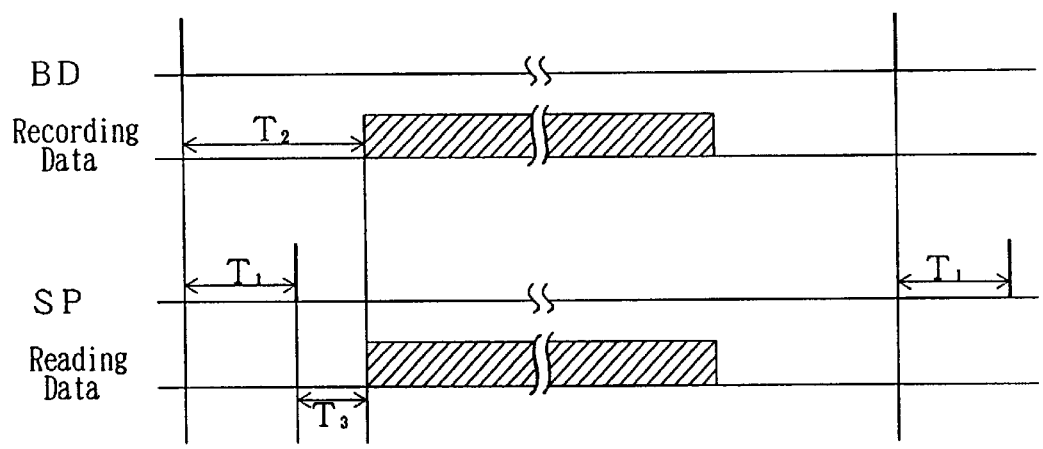
FIG. 5 is a timing diagram showing the relationship between a record timing signal and a read timing signal.

The semiconductor laser device 31 generates, according to the image data, a laser beam which is reflected by the reflecting mirror 32. The collimating lens 33 collimates the reflected laser beam to suitably adjust the diameter of the laser beam, whereas the polygon mirror 34 as a beam deflector rotates to scan the laser beam in the primary scanning direction extending axially of the photosensitive drum 36. The scanning laser beam reflected by the polygon mirror 34 passes through the fθ lens 35 to form an electrostatic latent image on the photosensitive drum 36 by removal of electrostatic charge at portions where the laser beam is incident. The phototransistor 37 detects the scanning laser beam at a position immediately before the recording start position in the recording area L (effective scanning line) of the photosensitive drum 36 to generate a record timing signal BD (FIG. 5).

Figure 3:
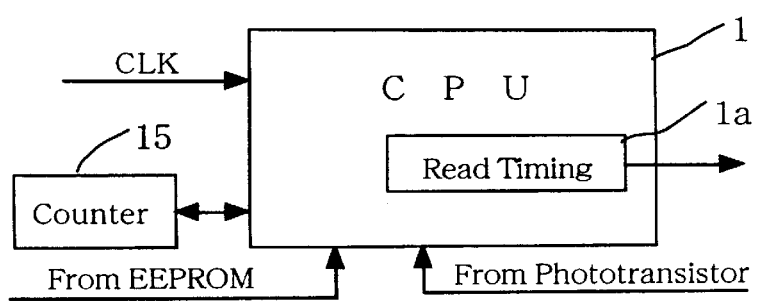
FIG. 3 is a block diagram showing the CPU of the same facsimile machine.

As shown in FIG. 3, the phototransistor 37 as a record timing signal generator feeds the record timing signal BD to the CPU 1 to determine the control start time for the scanning laser beam. The specific manner of determining the control start time is described for example in U.S. Pat. No. 4,264,120 which is hereby incorporated by reference. The CPU 1 is connected to a counter 15 and receives clock signals from a clock generator (not shown). The counter 15 combined with the CPU 1 and the unillustrated clock generator constitutes a timer means for determining the lapse of a predetermined time from the generation of the record timing signal BD. The predetermined time may be stored in the EEPROM 6 (see FIG. 1) for feeding to the CPU 1. The EEPROM 6 may store a plurality of preset times in corresponding relation to different paper sizes for selectively feeding to the counter 15. The plurality of preset times stored in the EEPROM 6 may be changed by operating the key switches of the operation section 13 if a change is made with respect to the specifications of the reading and/or recording sections 11, 12. The CPU 1 also incorporates a read timing signal generator 1a which produces a read timing signal SP for feeding to the reading section 11 (see FIG. 1) when the counter 15 counts up the predetermined time.

The facsimile machine thus designed operates in the following manner.

In the transmission mode, the reading section 11 reads the images of an image carrying paper sheet for output of image data. Then, the image data are coded at the codec 8 and modulated at the modem 4 for transmission through the NCU 2 and the telephone line 21.

In the reception mode, input image data received through the NCU 2 are demodulated at the modem 4 and decoded at the codec 8. Then, the recording section 12 prints out the decoded image data on a recording paper sheet.

In the copy mode, the reading section 11 reads the images of an image carrying paper sheet for output of image data which are transmitted, through the gate array 7, to the recording unit 12 for printing on a recording paper sheet as reproduced images.

The feature of the present invention resides in operation timing control between the reading section 11 and the recording section 12 in the copy mode. Thus, the copy mode operation of the facsimile machine is more specifically described with reference to FIGS. 4 and 5.

Figure 4:
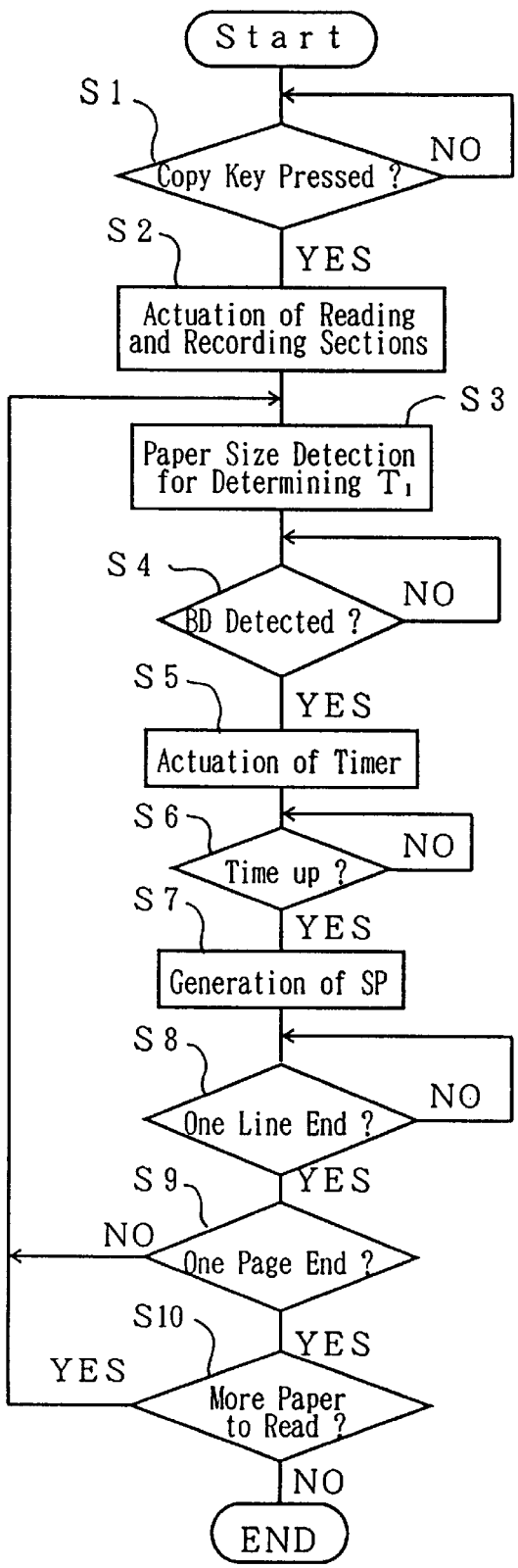
FIG. 4 is a flow diagram illustrating the copy mode operation of the same facsimile machine.

First, as shown in the flow diagram of FIG. 4, the CPU 1 monitors operation signals from the operation section 13 to determine whether the copy key (not shown) of the operation section 13 is pressed by the user (Step S1). Specifically, an operation signal is fed from the operation section 13 to the CPU 1 through the gate array 7 when the user places an image carrying paper sheet in the reading section 11 and presses the copy key, whereas no such signal is generated when the copy key is not pressed. If "NO" in Step S1, the CPU 1 waits until the copy key is pressed by the user.

If the copy key is pressed ("YES" in Step S1), the CPU 1 supplies an actuation signal to the reading section 11 and the recording section 12, respectively, through the gate array 7 (Step S2). As a result, the reading section 11 is actuated to detect the size of the image carrying paper sheet and feed the paper sheet to a predetermined position, whereas the recording section 12 is also actuated to feed a recording paper sheet to a predetermined position.

The detection of the paper size in the reading section 11 is utilized to determine which one of the preset values (wait time $T_1$) in the EEPROM 6 should be selected for best suiting to the detected paper size (Step S3).

In the recording section 12, on the other hand, the semiconductor laser device 31 and the polygon mirror 34 are activated so that the laser beam generated by the laser device 31 is scanned by the polygon mirror 34 in the primary scanning direction. The scanning laser beam thus generated projects to the phototransistor 37 immediately before the recording start position of the recording area L of the photosensitive drum 36. Consequently, the phototransistor 37 produces a record timing signal BD which is processed for wave form shaping or otherwise inside the recording section 12, as shown in the time chart of FIG. 5. The processed record timing signal BD is fed to the CPU 1 through the gate array 7 for detection (Step S4). If "NO" in Step S4, the CPU 1 waits for input of a record timing signal BD.

Upon detection of the record timing signal BD ("YES" in Step S4), the CPU 1 actuates the timer means (Step S5). More specifically, the CPU 1 reads out the previously selected value (see Step S3) from the relevant address of the EEPROM 6 for setting at the counter 15 which is a down counter. The counter 15 counts down the preset value in synchronism with clock signals of a predetermined frequency.

Then, the CPU 1 determines whether the counter 15 has completely counted down the preset value to zero (Step S6). In other words, the CPU 1 determines whether the predetermined wait time $T_1$ has lapsed since the generation of the record timing signal BD, as shown in FIG. 5. If "NO" in Step S5, the CPU 1 waits for a complete countdown.

Upon the lapse of the predetermined wait time $T_1$ ("YES" in Step S6), the read timing generator 1a of the CPU 1 produces a read timing signal SP for feeding to the reading section 11 (Step S7), as also shown in FIG. 5.

In the recording section 12 (FIG. 2), the scanning laser beam reaches the recording start position of the recording area L of the photosensitive drum 36 upon lapse of a recording delay time $T_2$ (see FIG. 5) after the generation of the record timing signal BD. The recording delay time $T_2$ depends on the rotational speed of the polygon mirror 34 which is relatively unstable. However, since the recording delay time $T_2$ is extremely short in comparison with the time required for one full rotation of the polygon mirror 34, it may be considered substantially constant for every rotation of the polygon mirror 34.

On the other hand, the CCD image sensor (not shown) of the reading section 11, upon input of the read timing signal SP, starts reading the image carrying paper sheet for serial output of image signals. However, the image sensor first makes serial output of ineffective image signals for an idle reading time $T_3$ and then makes serial output of effective image signals. The idle reading time $T_3$ depends on the design of the reading section 11 but may be considered constant for every cycle of reading.

As described above, both of the recording delay time $T_2$ and the idle reading time $T_3$ are substantially constant regardless of variations of the rotational speed of the polygon mirror 34 and can be determined in advance. Thus, by appropriately setting the wait time $T_1$ from the generation of the record timing signal BD to the generation of the read timing signal SP, the timing at which the CCD sensor of the reading section 11 starts output of effective image signals is made to coincide with the timing at which the scanning laser beam from the semiconductor laser device 31 of the recording section 12 reaches the recording start position of the recording area L of the photosensitive drum 36 for on-off control in accordance with the effective image signals. In other words, the counter 15 is so set that the wait time $T_1$ is equal to the recording delay time $T_2$ minus the idle reading time $T_3$ (namely, $T_2-T_3$). As a result, the reading operation of the reading section 11 is synchronized with the recording operation of the recording section 12 for each primary scanning line even if the the rotational speed or cycle of the polygon mirror 34 varies.

In Step S8, the CPU 1 determines whether the reading/recording for one line is complete. If "NO" in Step S8, the CPU 1 waits until the reading/reading for the current line finishes.

If "YES" in Step S8, the CPU 1 then determines whether the reading/recording for one page is complete (Step S9). If "NO" in Step S9, the copy mode steps are repeated for the next line starting from Step S3 wherein detection of another record timing signal BD is performed.

If "YES" in Step S9, the CPU 1 then determines if there is another image carrying paper sheet left in the reading section 12 (Step S10).

The routine of the copy mode finishes if "NO" in Step S10. Conversely, if "YES" in Step S10, the copy mode steps are repeated for the next page starting from Step S3 wherein detection of another record timing signal BD is performed.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

I claim:

1. An apparatus for reading and recording images comprising:

reading means for optically reading an image for output of image signals;

recording means for generating and controlling a light beam to record the read image on the basis of the image signals;

record timing signal generating means for detecting the light beam at a predetermined position and for generating a record timing signal which determines start timing for control of the light beam, the control of the light beam starting upon lapse of a delay time since the generation of the record timing signal;

timer means for determining lapse of a wait time since the generation of the record timing signal, the wait time being shorter than the delay time; and read timing signal generating means for generating, upon the lapse of the wait time, a read timing signal which determines timing for output of the image signals from the reading means.

2. The apparatus according to claim 1, wherein the timer means is capable of adjustably setting the predetermined time.

3. The apparatus according to claim 2, wherein the timer means sets the predetermined time in accordance with a paper size.

4. The apparatus according to claim 2, wherein the timer means comprises a counter to which a selected one of different preset values is fed to set the predetermined time.

5. The apparatus according to claim 4, wherein the counter is a down counter.

6. The apparatus according to claim 4, wherein the counter is connected to a central processing unit of the apparatus to which clock signals are supplied.

7. The apparatus according to claim 1, wherein the record timing signal generating means is a phototransistor arranged immediately before a recording start position.

8. The apparatus according to claim 1, wherein the read timing signal generating means is a read timing signal generator incorporated in a central processing unit of the apparatus.

9. The apparatus according to claim 1, wherein the light beam is a laser beam.

10. The apparatus according to claim 9, wherein the recording means comprises an electrophotographic unit which includes a photosensitive medium for forming an electrostatic latent image by irradiation of the laser beam under on-off control according to the image signals and for transferring the latent image onto a recording paper.

11. An apparatus for reading and recording images comprising:

a reading section for optically reading an image from an image carrying medium for output of image signals;

a recording section responsive to the reading section for generating and controlling a light beam to record the read image on the basis of the image signals;

a light sensor for detecting the light beam at a predetermined position and for generating a record timing signal which determines start timing for control of the light beam, the control of the light beam starting upon lapse of a delay time since the generation of the record timing signal;

a counter responsive to the light sensor for determining lapse of a wait time since the generation of the record timing signal, the wait time being shorter than the delay time; and a read timing signal generator responsive to the counter for generating, upon the lapse of the wait time, a read timing signal which determines timing for output of the image signals from the reading section.

12. The apparatus according to claim 11, wherein the counter is capable of adjustably setting the predetermined time.

13. The apparatus according to claim 12, wherein the counter sets the predetermined time in accordance with a paper size.

14. The apparatus according to claim 12, wherein the predetermined time of the counter is set by feeding a selected one of different preset values.

15. The apparatus according to claim 11, wherein the light sensor is a phototransistor arranged immediately before a recording start position.

* * * * *